United States Patent [19]

Bohn

[11] Patent Number: 6,050,583
[45] Date of Patent: Apr. 18, 2000

[54] ELECTRONICALLY CONTROLLED BICYCLE SUSPENSION APPARATUS

[76] Inventor: David D. Bohn, 2900 Eindborough Dr., Fort Collins, Colo. 80525

[21] Appl. No.: 08/991,585

[22] Filed: Dec. 15, 1997

Related U.S. Application Data

[60] Provisional application No. 60/035,824, Jan. 13, 1997.

[51] Int. Cl.$^7$ .................................................. B60G 17/015
[52] U.S. Cl. ........................ 280/283; 188/282.4; 701/37
[58] Field of Search .................................. 280/283, 284, 280/285, 286; 188/266.2, 266.3, 266.4, 266.5, 282.2, 282.3, 282.4, 284, 299.1; 701/37

[56] References Cited

U.S. PATENT DOCUMENTS

| | | | |
|---|---|---|---|
| 4,313,529 | 2/1982 | Kato et al. ............................... | 188/299 |
| 4,572,317 | 2/1986 | Isono et al. .............................. | 180/227 |
| 4,679,811 | 7/1987 | Shuler .................................... | 280/284 |
| 4,881,750 | 11/1989 | Hartmann ............................... | 280/276 |
| 5,044,648 | 9/1991 | Knapp ..................................... | 280/283 |
| 5,184,703 | 2/1993 | Van Zeggeren .......................... | 188/319 |
| 5,277,283 | 1/1994 | Yamaoka et al. ........................ | 188/319 |
| 5,308,099 | 5/1994 | Browning ................................ | 280/276 |
| 5,445,401 | 8/1995 | Bradbury ................................ | 280/276 |
| 5,452,910 | 9/1995 | Harris ..................................... | 280/284 |
| 5,456,480 | 10/1995 | Turner et al. ........................... | 280/276 |
| 5,470,090 | 11/1995 | Stewart et al. .......................... | 280/276 |
| 5,509,674 | 4/1996 | Browning ................................ | 280/276 |
| 5,509,677 | 4/1996 | Bradbury ................................ | 280/276 |
| 5,580,075 | 12/1996 | Turner et al. ........................... | 280/276 |
| 5,921,572 | 7/1999 | Bard et al. .............................. | 280/284 |
| 5,971,116 | 10/1999 | Franklin ................................ | 188/282.4 |

OTHER PUBLICATIONS

Analog Devices, Inc. Model ADXL05 Product Literature Oct. 1996.

Humphrey, Inc. Model LA01 & LA02 Product Literature Dec. 1997.

Intel Corporation 8–Bit MCS51 CHMOS Microcontroller Product Literature Jan. 1995.

Motorola, Inc. 8–Bit MC68HC11 Microcontroller Product Literature Dec. 1997.

*Primary Examiner*—Kevin Hurley
*Attorney, Agent, or Firm*—Flanagan & Flanagan; John R. Flanagan; John K. Flanagan

[57] ABSTRACT

An electronically controlled bicycle suspension apparatus includes a suspension system, a sensor such as a biaxial accelerometer, an electronics module, at least one actuator and at least one battery for powering the sensor, electronics module and actuator. The suspension system mounted to and between first and second parts of a bicycle movable relative to one another in response to a shock applied to the bicycle, includes a cylinder having telescoping members defining an interior cavity and respectively connected to the first and second relative movable bicycle parts and movable toward and away from one another between predetermined limits, an extendable and contractible spring disposed within the interior cavity being biased to force the telescoping members away from one another, a fluid contained in the interior cavity and a partition fixed across the interior cavity inside of a telescoping members to divide the interior cavity into separate chambers. The partition defines at least one orifice having a predetermined size for controlling a rate of flow of the fluid between the chambers so as to control contraction of the spring and thereby control movement of the telescoping members toward one another. The actuator is coupled to the cylinder and movable relative thereto to change the size of the orifice in the partition of the suspension system. The sensor is mounted to either one the first and second relative movable parts of the bicycle.

43 Claims, 4 Drawing Sheets

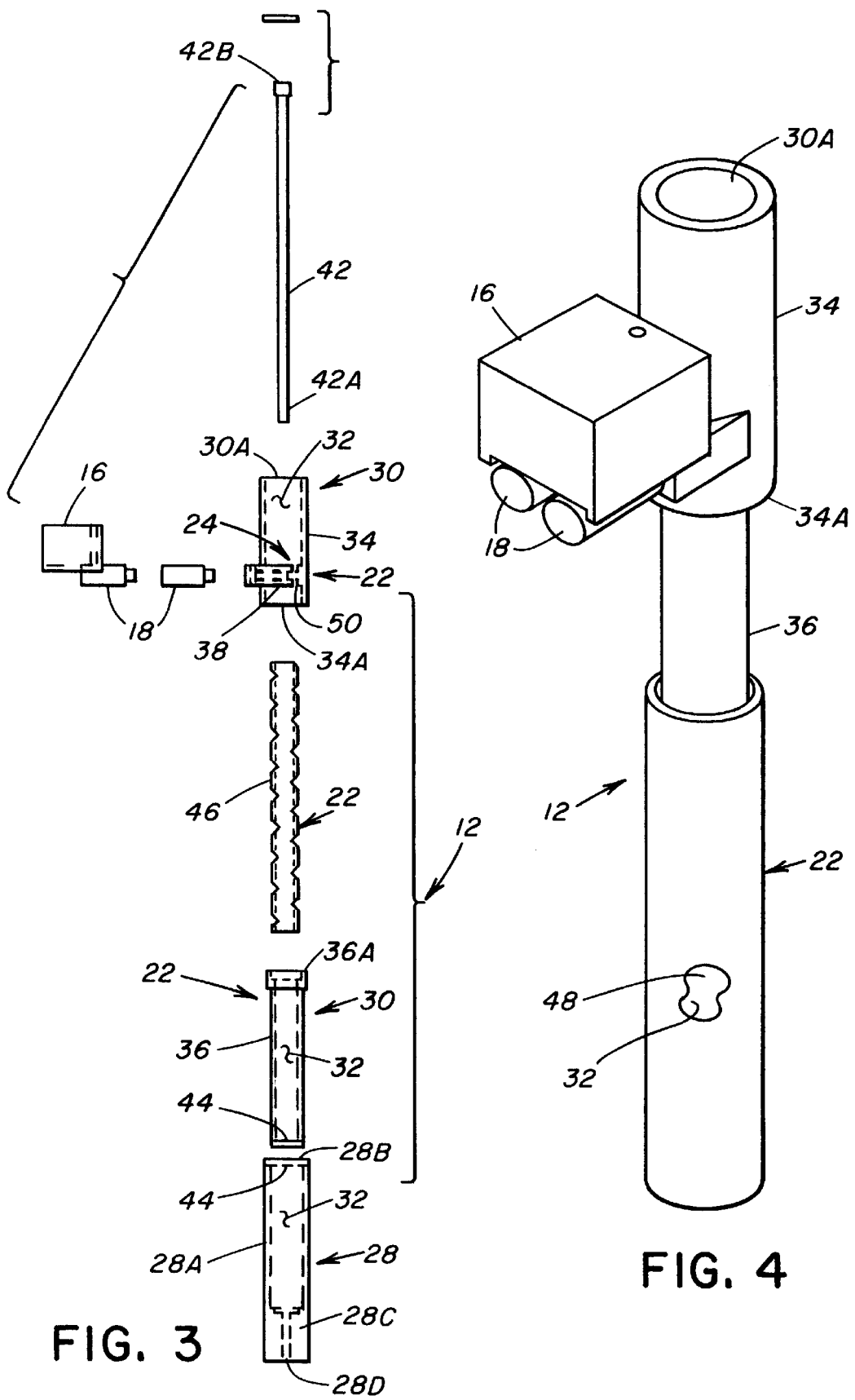

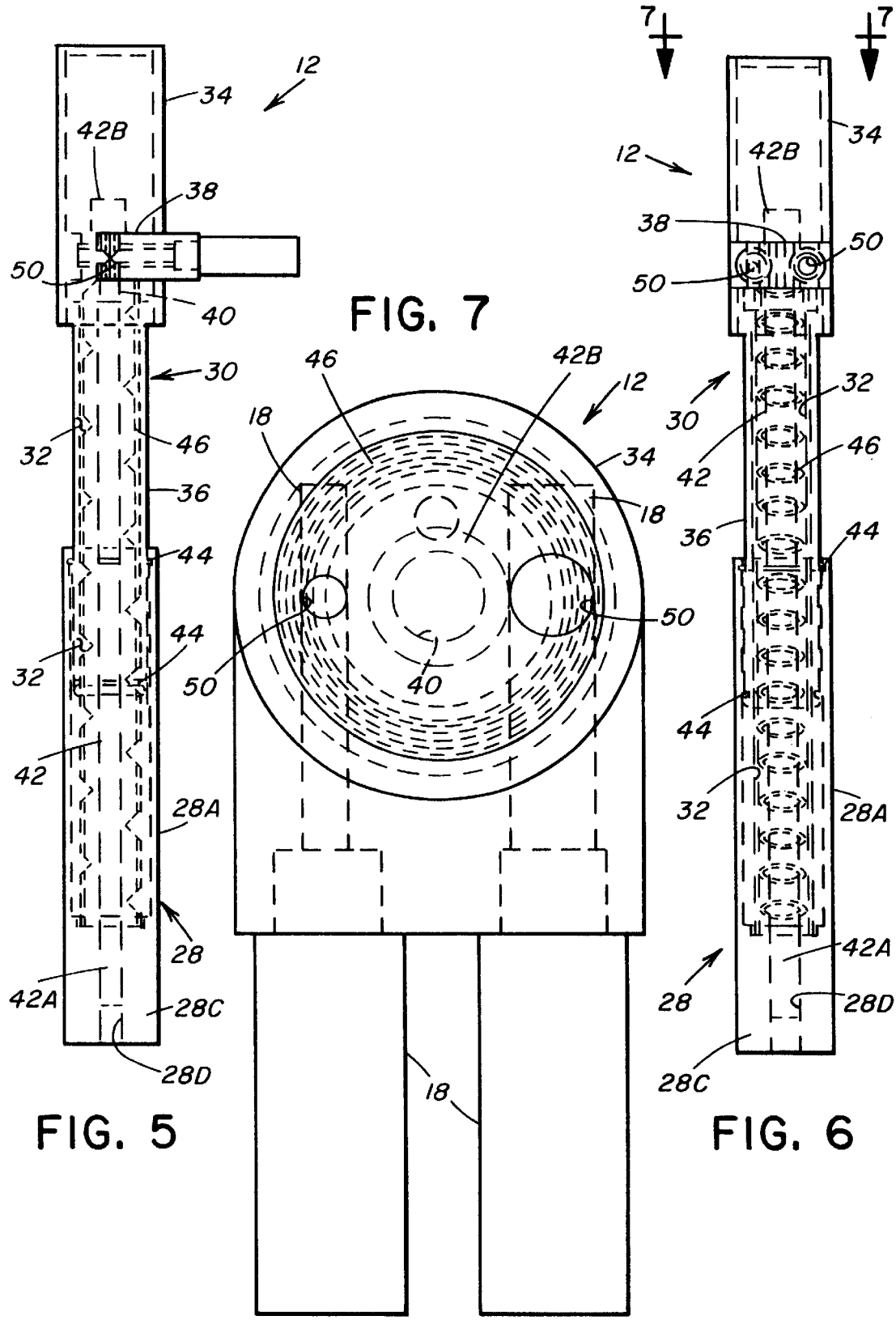

ELECTRONICALLY CONTROLLED BICYCLE SUSPENSION APPARATUS

This application claims the benefit of U.S. provisional application Ser. No. 60/035,824, filed Jan. 13, 1997.

BACKGROUND OF THE INVENTION

1. Field of the Invention

The present invention generally relates to suspension systems for bicycles and, more particularly, is concerned with an electronically controlled bicycle suspension apparatus for actively adjusting the bicycle suspension to adapt to the immediate conditions being experienced by the bicyclist.

2. Description of the Prior Art

In recent years suspension systems on bicycles, particularly on mountain bikes, have become more common. Some examples of bicycle suspension systems are the ones disclosed in U.S. Pat. No. 4,679,811 to Shuler, U.S. Pat. No. 4,881,750 to Hartmann, U.S. Pat. No. 5,044,648 to Knapp, U.S. Pat. Nos. 5,308,099 and 5,509,674 to Browning, U.S. Pat. Nos. 5,445,401 and 5,509,677 to Bradbury, and U.S. Pat. Nos. 5,456,480 and 5,580,075 to Turner et al.

A common drawback of most suspension systems is that they are passive mechanical systems which do not sense change in riding conditions nor automatically adjust in response thereto. This results in suspension systems that may be too stiff for extremely rocky, steep descents and too soft for riding on surfaced roads and bike paths. Some suspension systems allow the rider to adjust the pretension on the suspension components. However, this process normally requires stopping the bicycle to manually make the necessary adjustments. The rider must estimate the stiffness or softness that might be required for the anticipated riding conditions. Also, the adjustments in some of these systems require the use of tools.

The above-cited Turner et al. U.S. Pat. No. 5,456,480 contains a caution to designers that electronic control of bicycle suspensions is impractical. This statement seems intended to discourage any attempts to improve bicycle suspensions through the development of an electronically-based solution to controlling the suspensions in order to adjust to different riding conditions. Nevertheless, it is the perception of the inventor herein that a different approach, possibly one that is electronically-based, is needed in the design of suspension systems for bicycles, especially on mountain bikes, to improve their handling and performance.

SUMMARY OF THE INVENTION

The present invention provides an electronically controlled bicycle suspension apparatus designed to satisfy the aforementioned need. The apparatus of the present invention employs an electronics module, sensor means, actuator means and a power source in conjunction with a suspension on a bicycle for actively adjusting the bicycle suspension to immediate conditions experienced by a user of the bicycle. The sensor means actively senses one or more of forward velocity, tilt or inclination, and vertical acceleration of the bicycle and produces signals representative thereof as inputs to the electronics module which processes the inputs and produces an output causing activation of the actuator means to adjust the suspension system to optimize it for the current riding conditions being experienced by the bicyclist.

Accordingly, the present invention is directed to a electronically controlled bicycle suspension apparatus for use on a bicycle. The apparatus comprises: (a) a suspension system mounted to and between first and second parts of a bicycle movable relative to one another in response to a shock applied to the bicycle, the suspension system including first means connected between the first and second relative movable parts of the bicycle and capable of absorbing shock applied to the bicycle and second means connected to the first means for controlling the degree of shock absorbing capability of the first means; (b) means mounted to either one of the first and second relative movable parts of the bicycle for sensing at least one of a plurality of conditions including forward velocity, tilt and vertical acceleration of the bicycle and producing an input representative thereof; (c) an electronics module mounted to the bicycle and connected to the sensing means for receiving and processing the input from the sensing means to produce an output corresponding to a desired predetermined response to the at least one of the conditions sensed by the sensing means; (d) at least one actuator mounted to the bicycle and coupled to the suspension system for receiving the output from the electronics module and in response thereto causing the second means of the suspension system to affect the first means of the suspension system so as to actively adjust the suspension system to immediate surface conditions experienced by a user of the bicycle so as to improve control of the bicycle; and (e) means for electrically powering the sensing means, the electronics module and the at least one actuator.

More particularly, the first means of the suspension system includes a cylinder having telescoping members defining an interior cavity and respectively connected to the first and second parts of the bicycle movable relative to one another and movable toward and away from one another between predetermined limits, and an extendable and contractible spring disposed within the interior cavity being biased to force the telescoping members away from one another. The second means of the suspension system includes a fluid contained in the interior cavity and a partition fixed across said interior cavity inside one of the telescoping members to divide the interior cavity into separate chambers in the telescoping members. The partition defines at least one orifice having a predetermined size for controlling a rate of flow of the fluid between the chambers of the telescoping members so as to control contraction of the spring and thereby control the movement of the telescoping members toward one another.

The actuator is coupled to the cylinder of the first means of the suspension system and movable relative thereto to change the size of the orifice of the partition of the second means of the suspension system. The sensing means preferably is a biaxial accelerometer. The electrical powering means preferably is at least one battery.

The apparatus may also include means connected to the electronics module for displaying information to the user and means connected to the electronics module for the user to manually actuate to override the adjustment of the suspension system so as to set the suspension system to a known degree of stiffness setting.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is an exploded view of the apparatus.

FIG. 4 is an assembled view of the apparatus.

FIG. 5 is an elevational view of the apparatus of FIG. 4 without the electronics module.

FIG. 6 is another elevational view of the apparatus rotated 90° from the position of FIG. 5.

FIG. 7 is a top plan view of the apparatus as seen along line 7—7 in FIG. 6.

DETAILED DESCRIPTION OF THE INVENTION

Figure 1:
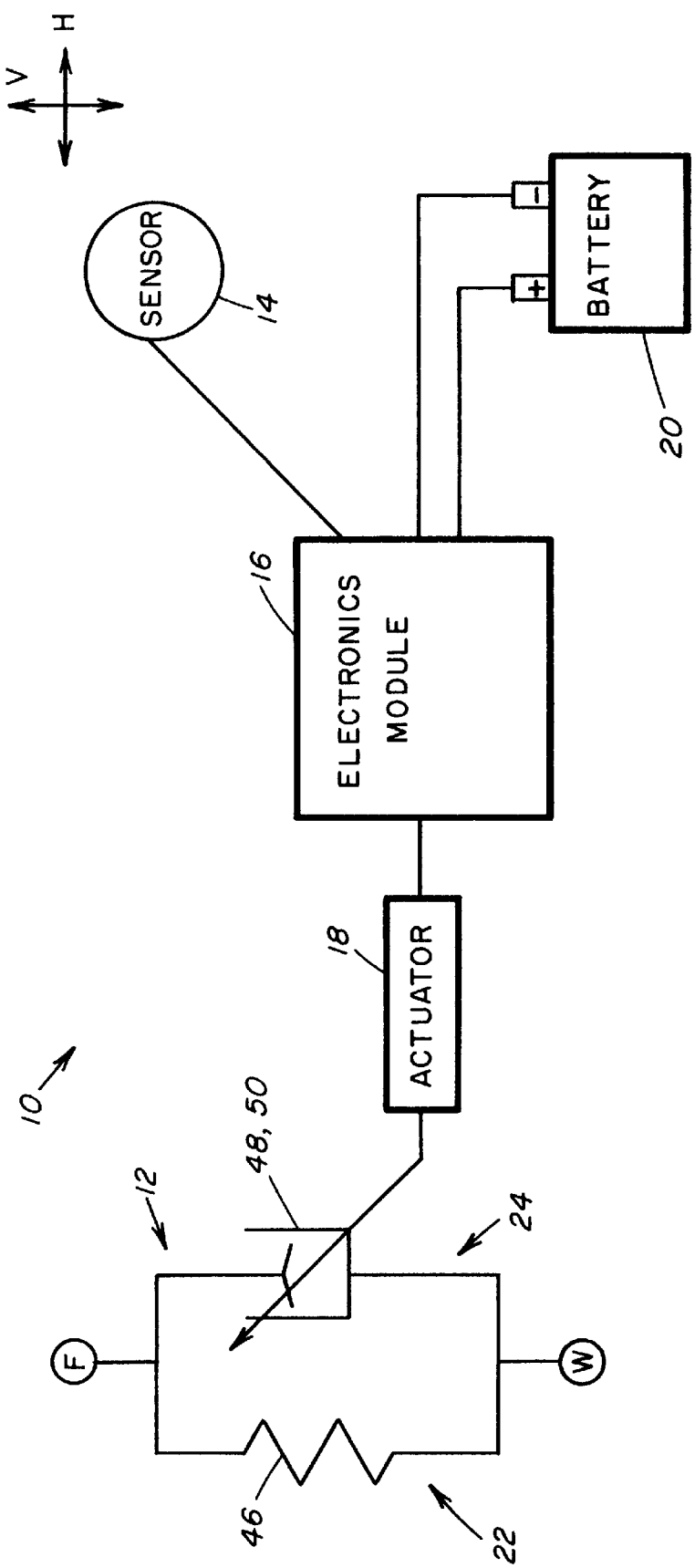
FIG. 1 is a diagrammatic representation of an electronically controlled bicycle suspension apparatus of the present invention.

Referring to the drawings and particularly to FIGS. 1 to 4, there is illustrated an electronically controlled bicycle suspension apparatus, generally designated 10, of the present invention. Basically, the apparatus 10 includes a suspension system 12, sensing means 14, an electronics module 16, at least one actuator 18 and an electrical powering means 20 for supplying electrical power to the sensing means 14, electronics module 16 and actuator means 18. The suspension system 12 is generally mounted to and extends between parts of a bicycle, for example as shown diagrammatically in FIG. 1 the bicycle frame F and bicycle wheel support W pivotally mounted to the bicycle frame F, which are movable relative to one another in response to a shock applied to the bicycle. The suspension system 12 could be attached either one or both of the rear wheel support or front wheel support. In the case of being attached to the front wheel, the support with the suspension system incorporated therein usually is in the form of dual suspension forks. In the case of being attached to the rear wheel, the suspension is usually implemented through a pivotal connection to the bicycle frame and to the rear wheel support arm.

The suspension system 12 includes first means 22 connected between the aforementioned parts F, W of the bicycle and capable of absorbing shock applied to the bicycle and second means 24 connected to the first means 22 for controlling the degree of shock absorbing capability of the first means 22. The sensing means 14 is mounted to either one of the aforementioned relative movable parts of the bicycle to which the suspension system 12 is connected in responding to a shock applied to the bicycle, and is provided for sensing one, two or all of a plurality of conditions including forward velocity, tilt and vertical acceleration of the bicycle and producing an input I representative thereof to the electronics module 16. The electronics module 16 is mounted to the bicycle and connected to the sensing means 14 for receiving the input L from the sensing means 14 and processing the input L to produce an output M corresponding to a desired predetermined response to the one, two or all of the conditions sensed by the sensing means 14. The actuator means 18 is mounted to the bicycle and coupled to the suspension system 12 for receiving the output M from the electronics module 16 and in response thereto causing the second means 24 of the suspension system 12 to affect the first means 22 of the suspension system 12 so as to actively adjust the suspension system 12 to accommodate the immediate surface conditions experienced by a user of the bicycle so as to improve control over the riding of the bicycle by the user under such immediate surface conditions.

Referring now to FIGS. 1 and 3–7, the first means 22 of the suspension system 12 includes a cylinder 26 having outer and inner tubular telescoping members 28, 30 defining an interior cavity 32 in the cylinder 26 and respectively connected to the parts F, W of the bicycle which are slidably movable in telescoping relation with respect to one another. The telescoping members 28, 30 of the cylinder 26 are movable toward and away from one another between predetermined limits. The outer telescoping member 28 of the cylinder 26 has a tubular body portion 28A open at one end 28B and closed at the opposite end by a base 28C with a threaded bore 28D defined therethrough. The inner telescoping member 30 of the cylinder 26 is made of an upper header tube 34 and a lower extension tube 36. A head end 36A of the lower extension tube 36 is received in and fastened to a bottom end 34A of the upper header tube 34 such that the upper header tube 34 and lower extension tube 36 will function together as the unitary inner telescoping member 30 of the cylinder 26. Adjacent to the head end 36A of the lower extension tube 36, the upper header tube 34 has a plate-like partition 38 fixed across the interior cavity 32 with an aperture 40 defined centrally therethrough.

The predetermined limit of retraction of the outer and inner telescoping members 28, 30 toward one another is established by the head end 36A of the lower extension tube 34 of the inner telescoping member 30 engaging the open end 28B of the outer telescoping member 28. The predetermined limit of extension of the outer and inner telescoping members 28, 30 away from one another is established by an elongated tension bolt 42 of the first means 22 that extends through the central aperture 40 of the partition 38 and is threaded at its lower end 42A into the threaded bore 28D of the base 28C of the outer member 28. The tension bolt 42 has an enlarged head 42B thereon that engages the upper side of the partition 38 when the outer and inner telescoping members 28, 30 are fully extended away from one another as seen in FIGS. 5 and 6. The open end 30A of the inner telescoping member 30 opposite from the upper header tube 34 and the open end 28B of the body portion 28A of the outer tube 28 both have respective O-rings 44 mounted thereto for providing hermetic seals between the outer and inner telescoping members 28, 30 while accommodating their relative sliding movement. The first means 22 also includes an extendable and contractible coil spring 46 disposed within the interior cavity 32 of the cylinder 26 being biased to force the outer and inner telescoping members 28, 30 to move or extend away from one another.

The second means 24 of the suspension system 12 includes a fluid 48 contained in the interior cavity 32 and the aforementioned partition 38 fixed across the interior cavity 32 inside the upper header tube 34 of the inner telescoping members 30 so as to divide the interior cavity 32 into a pair of separate chambers 32A, 32B in the outer and inner telescoping members 28, 30. The partition 38 defines at least one and, preferably, a pair of orifices 50 therethrough on opposite sides of the central aperture 40. The orifices 50 are provided with respective predetermined sizes for controlling the rate of flow of the fluid 48 between the chambers 32A, 32B of the cylinder 26 so as to control contraction of the spring 46 and thereby control movement of the outer and inner telescoping members 28, 30 toward one another in absorbing the shock applied to the bicycle. This arrangement is commonly referred to as a variable oil damper. In an exemplary embodiment illustrated in FIGS. 5–7, a pair of orifices 50 are provided through the partition 38, with the size of one of the orifices 50 preferably being greater than the size of the other of the orifices 50. For instance, the size of one orifice 50 may be about half the size of the other orifice 50. However, it should be understood that this is by way of example only, since only one orifice 50 can be used to practice the invention.

The sensing means 14 of the apparatus 10 preferably, but not necessarily, is a biaxial accelerometer, such as a commercially available Humphrey LA02 device or an Analog Devices ADXL05 device. The biaxial accelerometer 14 operates along two axes disposed in substantially orthogonal or perpendicular relation to one another. One axis of the accelerometer 14 is oriented parallel to the forward direction of travel of the bicycle along a horizontal axis H and the other axis is oriented parallel to the gravitational vector along a vertical axis V. The biaxial accelerometer 14 along its horizontal axis H measures forward velocity and tilt of the bicycle and along its vertical axis V measures vertical acceleration of the bicycle. The measurements along these two axes are combined to produce the input L representative thereof. The input L includes two signals, one a DC signal and the other an AC signal. The tilt (T) of the bicycle is determined by the DC signal variation in the H direction compared to the gravitational vector. From this electrical calculation the amount of tilt, either inclination or declination, can be determined. The forward velocity (FV) is determined by an integration of the acceleration in the H direction. The vertical acceleration (VA) is determined by direct measurement of the AC signal amplitude in the V direction. The vertical acceleration of the bicycle is the principal condition which indicates the degree of roughness or smoothness of a riding surface and is parallel to the normal force of the riding surface.

While a single biaxial accelerometer is the preferred type of sensor means 14, different combinations of sensors could be used to accomplish the same sensor input to the electronics module 16. In the case of using only the forward velocity and tilt as the input this could be accomplished using other types of sensing technology. For example, the speed could be sensed by a Hall effect type sensor attached to one of the wheels. The tilt could be sensed using a fluid level sensor.

Figure 2:
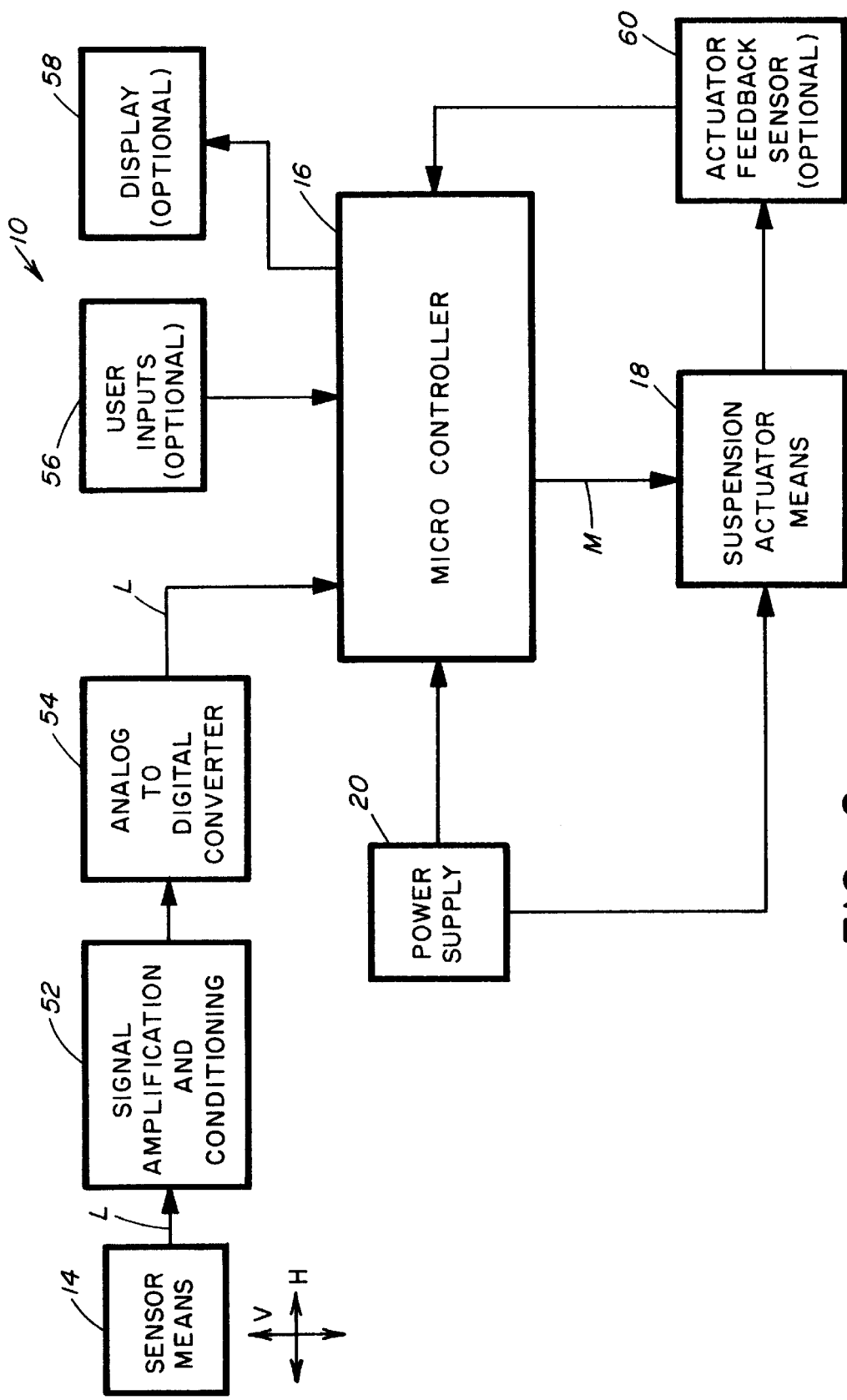
FIG. 2 is a block diagram of the apparatus.

The electronics module 16 can be a conventional microcontroller, such as a commercially available Motorola MC68HC11 or an Intel 80C51BH, but can be of any other suitable make. The input L from the sensing means 14, after undergoing amplification and conditioning at block 52 shown in FIG. 2 and then conversion from analog to digital form at block 54 also shown in FIG. 2, is provided to the electronics module 16 which then processes the input L and produces output M. The output M adjusts the actuator means 18. It is believed that one of ordinary skill in the art would be able to program a conventional microcontroller or microprocessor to produce the desired output M from the input L without having to exercise an undue amount of experimentation to accomplish the task. One practical example of a scheme for operation of the electronics module 16 in receiving and processing of the input L and producing output M is provided hereinafter. Different combinations of input L and output M of this example are shown in Table 1.

As set forth above, the signals making up input L represent the tilt (T), forward velocity (FV) and vertical acceleration (VA) of the bicycle. As mentioned above, the DC signal represents the tilt (T) and has separate values designated as "o" for when the bicycle is traveling on level ground with an angle of 5 degrees or less, "+" for going up a hill of more than 5 degrees and "−" for going down a hill of more than 5 degrees. Combinations of these values for input M are shown in Table 1. As mentioned before, the forward velocity is determined by integrating the acceleration in H direction and the vertical acceleration is the amplitude of the AC signal in the V direction. The forward velocity (FV) has separate values designated as "−" for when the bicycle has a forward velocity in a low range of less than 8 miles per hour, "o" for a mid range of 8 to 15 miles per hour, and "+" for a high range of more than 15 miles per hour. The vertical acceleration (VA) has separate values designated as "−" for when the bicycle is experiencing a vertical acceleration in a low range of less than 0.1 g's, "o" for a mid range of 0.1 to 1.0 g's and "+" for a high range of more than 1.0 g's. The combinations of these values are also presented in Table 1. As far as the above ranges of values for tilt, forward velocity and vertical acceleration are concerned, these are given herein as examples only; other ranges could equally be selected for use.

The output M, as mentioned, corresponds to a desired predetermined response to the input L, which represents one, two or all of forward velocity, tilt and vertical acceleration of the bicycle. The output M will signal the actuator means 18 to either open or to close the orifice(s) 50 depending on the combination of values of the input L presented. The closing of the orifice(s) 50 stiffens the suspension system 12, whereas the opening of the orifice(s) 50 softens the suspension system 12. Also the desired adjustment to the suspension system 12 might be different whether it is associated with the front or rear wheel of the bicycle.

Where a pair of actuators 18 and orifices 50 are employed, the output M has four possible combinations of values for an actuator A1 (working on the smaller size orifice) and an actuator A2 (working on the larger size orifice) as follows: "0 and 0", "1 and 0", "0 and 1" and "1 and 1" which respectively correspond to adjustment to a hard (stiff), half-hard, half-soft and soft suspension for the riding surface being encountered by the rider. The number "0" means orifice is closed; the number "1" means the orifice is open. The resulting combinations of output M values corresponding to the various combinations of input L values are shown in Table 1.

TABLE 1

| | Input (L) | | | Output (M) | |
|---|---|---|---|---|---|
| No. | T | FV | VA | A1 | A2 |
| 1 | o | + | + | 1 | 1 |
| 2 | o | + | − | 0 | 0 |
| 3 | o | + | o | 1 | 0 |
| 4 | o | o | + | 0 | 1 |
| 5 | o | o | − | 1 | 1 |
| 6 | o | o | o | 1 | 0 |
| 7 | o | − | + | 0 | 1 |
| 8 | o | − | − | 0 | 0 |
| 9 | o | − | o | 1 | 0 |
| 10 | + | + | + | 0 | 1 |
| 11 | + | + | − | 0 | 0 |
| 12 | + | + | o | 1 | 0 |
| 13 | + | o | + | 0 | 1 |
| 14 | + | o | − | 0 | 0 |
| 15 | + | o | o | 1 | 0 |
| 16 | + | − | + | 1 | 1 |
| 17 | + | − | − | 0 | 0 |
| 18 | + | − | o | 0 | 0 |
| 19 | − | + | + | 0 | 0 |
| 20 | − | + | − | 1 | 1 |
| 21 | − | + | o | 1 | 0 |
| 22 | − | o | + | 1 | 1 |
| 23 | − | o | − | 0 | 0 |
| 24 | − | o | o | 1 | 0 |
| 25 | − | − | + | 1 | 1 |
| 26 | − | − | − | 0 | 0 |
| 27 | − | − | o | 1 | 0 |

A few typical riding environments and corresponding adjustments are as follows:

(1) Fast cycling on a hard, level surface; referring to No. 2 above, the input (L) would be: tilt (T) is level (o), forward velocity (FV) is high (+) and vertical acceleration (VA) is low (−); the output (M) would be: close both orifices so A1 and A2 would both be 0. The result is a stiff suspension system 12 for better handling and more efficient energy transfer to the bicycle wheels.

(2) Slow, steep descent on a rocky single track trail; referring to No. 25 above, the input (L) would be: tilt (T) is downhill or negative (−), forward velocity (FV) is low (−) and vertical acceleration (VA) is high (+); the output (M) would be: open both orifices so A1 and A2 would both be 1. The result is soft suspension system 12 for better handling of bicycle. These represent only two possible riding situations. As mentioned above, the output would likely be different based on whether the output is being sent to the front or rear suspension. For example, there may be certain riding situations where a stiff rear suspension should be combined with a soft front suspension. This situation would occur during an ascent up a rocky single track trail.

In the illustrated example, the actuator means 18 is a pair of actuators 18, such as reciprocable solenoid types, which are operable in conjunction with the pair of orifices 50 of the partition 33 of the second means 24 of the suspension system 12. Each actuator 18 is coupled to the cylinder 26 of the first means 22 of the suspension system 12 and movable relative thereto to change the size of its respective one of the orifices 50 of the partition 38 of the second means 24 of the suspension system 12 to correspondingly change the rate of fluid flow through the orifice 50. Each actuator 18 has a size congruent with the size of the orifice 50 which it moves in relation to. Although the illustrated example shows a pair of actuators 18 operable in conjunction with the pair of orifices 50, it should be clearly understood that this is only one option. Only one actuator 18 operable in conjunction with only one orifice is another option. Also, each actuator 18 can take other forms, such as a motor and rotary valve instead of a reciprocatory solenoid. Also each actuator can be a type which undergoes a proportionate type of movement.

The electrical powering means 20 is at least one battery of any suitable type, such as two AA batteries. As represented respectively by blocks 56, 58, 60 in FIG. 2, the apparatus 10 may also have a means for providing user inputs for overriding the automatic adjustment operation, a display for the electronics module 16 and/or an actuator feedback sensor. With respect to the user override input 56, the user override would be used to set the suspension system 12 to a known stiffness setting; for example, for a long ride over pavement the user might choose to lock the suspension system 12 in the stiff position. With respect to the functions of the display 58, typical information displayed might include, but not limited to the following: battery indicator; manual suspension settings; maximum speed, tilt and vertical acceleration over the current ride, average speed, etc.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An electronically controlled bicycle suspension apparatus for use on a bicycle, said apparatus comprising:
    (a) a suspension system mounted to and between first and second parts of a bicycle movable relative to one another in response to a shock applied to the bicycle, said suspension system including
        (i) first means connected between the first and second relative movable parts of the bicycle and capable of absorbing shock applied to the bicycle, and
        (ii) second means connected to said first means for controlling the degree of shock absorbing capability of said first means;
    (b) means mounted to either one of the first and second relative movable parts of the bicycle for sensing at least one of a plurality of conditions including forward velocity, tilt and vertical acceleration of the bicycle and producing an input representative thereof;
    (c) an electronics module mounted to the bicycle and connected to said sensing means for receiving and processing said input from said sensing means to produce an output corresponding to a desired predetermined response to the at least one of said conditions sensed by said sensing means;
    (d) at least one actuator mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and
    (e) means for electrically powering said sensing means, said electronics module and said at least one actuator.

2. The apparatus of claim 1 wherein said first means of said suspension system includes:
    a cylinder having telescoping members defining an interior cavity and respectively connected to the first and second parts of the bicycle movable relative to one another, said telescoping members being movable toward and away from one another between predetermined limits; and
    an extendable and contractible spring disposed within said interior cavity being biased to force said telescoping members away from one another.

3. The apparatus of claim 2 wherein said second means of said suspension system includes:
    a fluid contained in said interior cavity; and
    a partition fixed across said interior cavity inside one of said telescoping members to divide said interior cavity into separate chambers in said telescoping members, said partition defining at least one orifice having a predetermined size for controlling a rate of flow of said fluid between said chambers of said telescoping members so as to control contraction of said spring and thereby control movement of said telescoping members toward one another.

4. The apparatus of claim 3 wherein said at least one actuator is coupled to said cylinder of said first means of said suspension system and movable relative thereto to change said size of said at least one orifice of said partition of said second means of said suspension system.

5. The apparatus of claim 4 further comprising:
    a pair of said actuators mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and a pair of said orifices defined in said partition each having a predetermined size for controlling a rate of flow of said fluid between said chambers of said telescoping members so as to control contraction of said spring and thereby control movement of said telescoping members toward one another.

6. The apparatus of claim 5 wherein said size of one of said orifices of said partition of said second means of said suspension system is greater than said size of the other of said orifices.

7. The apparatus of claim 5 wherein each of said pair of actuators is coupled to said cylinder of said first means of said suspension system and movable relative thereto to change said size of one of said orifices of said partition of said second means of said suspension system.

8. The apparatus of claim 1 wherein said sensing means is a biaxial accelerometer.

9. The apparatus of claim 1 wherein said one of said conditions sensed by said sensing means is forward velocity of the bicycle.

10. The apparatus of claim 1 wherein said one of said conditions sensed by said sensing means is angular tilt of the bicycle relative to a vertical reference.

11. The apparatus of claim 1 wherein said one of said conditions sensed by said sensing means is vertical acceleration of the bicycle.

12. The apparatus of claim 1 further comprising:

means connected to said electronics module for displaying information to the user.

13. The apparatus of claim 1 further comprising:

means connected to said electronics module for the user to manually actuate to override adjustment of said suspension system so as to set said suspension system to a known degree of stiffness setting.

14. The apparatus of claim 1 wherein said actuator is of a type that undergoes reciprocating movement to cause said adjustment of said suspension system.

15. The apparatus of claim 1 wherein said actuator is of a type that undergoes a predetermined movement to cause adjustment of said suspension system in proportion to said movement.

16. The apparatus of claim 1 wherein said actuator is of a type that undergoes rotary movement to cause said adjustment of said suspension system.

17. An electronically controlled bicycle suspension apparatus for use on a bicycle, said apparatus comprising:

(a) a suspension system mounted to and between first and second parts of a bicycle movable relative to one another in response to a shock applied to the bicycle, said suspension system including (i) first means connected between the first and second relative movable parts of the bicycle and capable of absorbing shock applied to the bicycle, and (ii) second means connected to said first means for controlling the degree of shock absorbing capability of said first means;

(b) means mounted to either one of the first and second relative movable parts of the bicycle for sensing at least two of a plurality of conditions including forward velocity, tilt and vertical acceleration of the bicycle and producing an input representative thereof;

(c) an electronics module mounted to the bicycle and connected to said sensing means for receiving and processing said input from said sensing means to produce an output corresponding to a desired predetermined response to the two of said conditions sensed by said sensing means;

(d) at least one actuator mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and (e) means for electrically powering said sensing means, said electronics module and said at least one actuator.

18. The apparatus of claim 17 wherein said first means of said suspension system includes:

a cylinder having telescoping members defining an interior cavity and respectively connected to the first and second parts of the bicycle movable relative to one another and movable toward and away from one another between predetermined limits; and an extendable and contractible spring disposed within said interior cavity being biased to force said telescoping members away from one another.

19. The apparatus of claim 18 wherein said second means of said suspension system includes:

a fluid contained in said interior cavity; and a partition fixed across said interior cavity inside one of said telescoping members to divide said interior cavity into separate chambers in said telescoping members, said partition defining at least one orifice having a predetermined size for controlling a rate of flow of said fluid between said chambers of said telescoping members so as to control contraction of said spring and thereby control movement of said telescoping members toward one another.

20. The apparatus of claim 19 further comprising:

a pair of said actuators mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and a pair of said orifices defined in said partition each having a predetermined size for controlling a rate of flow of said fluid between said chambers of said telescoping members so as to control contraction of said spring and thereby control movement of said telescoping members toward one another.

21. The apparatus of claim 20 wherein said size of one of said orifices of said partition of said second means of said suspension system is greater than said size of the other of said orifices.

22. The apparatus of claim 20 wherein each of said pair of actuators is coupled to said cylinder of said first means of said suspension system and movable relative thereto to change said size of one of said orifices of said partition of said second means of said suspension system.

23. The apparatus of claim 17 wherein said sensing means is a biaxial accelerometer.

24. The apparatus of claim 17 wherein said two of said conditions sensed by said sensing means are forward velocity of the bicycle and angular tilt of the bicycle relative to a vertical reference.

25. The apparatus of claim 17 wherein said two of said conditions sensed by said sensing means are angular tilt of the bicycle relative to a vertical reference and vertical acceleration of the bicycle.

26. The apparatus of claim 17 wherein said two of said conditions sensed by said sensing means are forward velocity of the bicycle and vertical acceleration of the bicycle.

27. The apparatus of claim 17 further comprising:
means connected to said electronics module for displaying information to the user.

28. The apparatus of claim 17 further comprising:
means connected to said electronics module for the user to manually actuate to override adjustment of said suspension system so as to set said suspension system to a known degree of stiffness setting.

29. The apparatus of claim 17 wherein said actuator is of a type that undergoes reciprocating movement to cause said adjustment of said suspension system.

30. The apparatus of claim 17 wherein said actuator is of a type that undergoes a predetermined movement to cause adjustment of said suspension system in proportion to said movement.

31. The apparatus of claim 17 wherein said actuator is of a type that undergoes rotary movement to cause said adjustment of said suspension system.

32. An electronically controlled bicycle suspension apparatus for use on a bicycle, said apparatus comprising:
(a) a suspension system mounted to and between first and second parts of a bicycle movable relative to one another in response to a shock applied to the bicycle, said suspension system including
  (i) first means connected between the first and second relative movable parts of the bicycle and capable of absorbing shock applied to the bicycle, and
  (ii) second means connected to said first means for controlling the degree of shock absorbing capability of said first means;
(b) means mounted to the bicycle for sensing forward velocity, tilt and vertical acceleration of the bicycle and producing an input representative thereof;
(c) an electronics module mounted to the bicycle and connected to said sensing means for receiving and processing said input from said sensing means to produce an output corresponding to a desired predetermined response to the forward velocity, tilt and vertical acceleration sensed by said sensing means;
(d) at least one actuator mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and
(e) means for electrically powering said sensing means, said electronics module and said at least one actuator.

33. The apparatus of claim 32 wherein said first means of said suspension system includes:
a cylinder having telescoping members defining an interior cavity and respectively connected to the first and second parts of the bicycle movable relative to one another and movable toward and away from one another between predetermined limits; and
an extendable and contractible spring disposed within said interior cavity being biased to force said telescoping members away from one another.

34. The apparatus of claim 33 wherein said second means of said suspension system includes:
a fluid contained in said interior cavity; and
a partition fixed across said interior cavity inside one of said telescoping members to divide said interior cavity into separate chambers in said telescoping members, said partition defining at least one orifice having a predetermined size for controlling a rate of flow of said fluid between said chambers of said telescoping members so as to control contraction of said spring and thereby control movement of said telescoping members toward one another.

35. The apparatus of claim 34 further comprising:
a pair of said actuators mounted to the bicycle and coupled to said suspension system for receiving said output from said electronics module and in response thereto causing said second means of said suspension system to affect said first means of said suspension system so as to actively adjust said suspension system to immediate surface conditions experienced by a user of the bicycle so as to improve control of the bicycle; and
a pair of said orifices defined in said partition each having a predetermined size for controlling a rate of flow of said fluid between said chambers of said telescoping members so as to control contraction of said spring and thereby control movement of said telescoping members toward one another.

36. The apparatus of claim 35 wherein said size of one of said orifices of said partition of said second means of said suspension system is greater than said size of the other of said orifices.

37. The apparatus of claim 35 wherein each of said pair of actuators is coupled to said cylinder of said first means of said suspension system and movable relative thereto to change said size of one of said orifices of said partition of said second means of said suspension system.

38. The apparatus of claim 32 wherein said sensing means is a biaxial accelerometer.

39. The apparatus of claim 32 further comprising:
means connected to said electronics module for displaying information to the user.

40. The apparatus of claim 32 further comprising:
means connected to said electronics module for the user to manually actuate to override adjustment of said suspension system so as to set said suspension system to a known degree of stiffness setting.

41. The apparatus of claim 32 wherein said actuator is of a type that undergoes reciprocating movement to cause said adjustment of said suspension system.

42. The apparatus of claim 32 wherein said actuator is of a type that undergoes a predetermined movement to cause adjustment of said suspension system in proportion to said movement.

43. The apparatus of claim 32 wherein said actuator is of a type that undergoes rotary movement to cause said adjustment of said suspension system.

* * * * *